United States Patent Office 3,412,772
Patented Nov. 26, 1968

3,412,772
PREVAILING TORQUE LOCK NUT
Herbert J. Meyfarth and William E. Kalt, Cleveland, Ohio, assignors to Republic Steel Corporation, Cleveland, Ohio, a corporation of New Jersey
Filed July 21, 1966, Ser. No. 566,797
3 Claims. (Cl. 151—21)

ABSTRACT OF THE DISCLOSURE

A self-locking fastener including a blank having a tapped bore the threads of which are of substantially equal depth. A crown on the blank is provided with a top end face having a circular outer edge and an irregularly shaped inner edge. Variations in the radial thickness of the end face provides inwardly hinged thread portions adjacent the thicker portions of end face.

---

This invention relates generally to an improved lock nut and more particularly to prevailing torque lock nuts having thread portions radially impacted or otherwise inwardly deformed into the threaded bore of the nut.

There has long been a requirement for a superior lock nut of the present type wherein the critical torque values can be positively controlled within narrow range increments at any level as specified by existing standards or trade requirements. For many years lock nuts have been available having distorted thread portions for providing a locking action with a one-piece metal fastener; however, for the most part many of these have fallen far short of achieving the characteristics desired of a nut of this type.

In one such prior device, the external shape of the nut is laterally and inwardly crimped to a degree sufficient to set up a permanent deformation to the internal threads and as a result there is an external deformation of the nut blank also. In such nuts, the dimension in line with the application of the crimping force must necessarily shrink while the other laterally opposed dimensions will be increased with the result that there is a distortion of the nut's designed geometric shape thereby providing an interference with the implement intended to be used to apply the lock nut during wrenching.

Another prior form of lock nut includes a plurality of external projections or lugs spaced radially around the crown wall thereof during the initial manufacture of the nut blanks. After generation of the nut thread, these projections are squeezed into the wall of the nut to achieve the distorted or displaced locking threads at which time small intermittent areas of the nut body and provided with increased resilience and tensile strength. This type of lock nut inherently produces severe manufacturing problems in the cold-forming equipment common to the fastener industry since the forming die as used to produce the lock nut must be relieved to provide for the necessary projections or lugs. As is well known, such relieved sections of the die are extremely difficult to duplicate and even then, the tool life is very low because of weak sections inherent in this type of die design. Any irregularity in the tool configuration will vary the degree of distortion betwen nut blanks treated with a resultant widening of the control values of the locking action torque thereby making it extremely difficult to meet the critical torque ranges required by the demands of the trade. In this type of nut the displacement of the small lugs or projections into the crown wall of the blank occurs over a relatively small area of the crown and it is this movement of a relatively large volume of material into a proportionately smaller immediate surface area that leads to the hazard of objectionable fractures which will be evidenced by the appearance of hairline cracks in the crown wall.

The present invention overcomes the objections found in the previously known types of lock nuts by providing a one-piece all metal lock nut having an improved ease of manufacture and a more finite control over specific levels of application torque values for locking purposes. This is achieved by providing a lock nut whose top or crown is deformed by staking. Geometrically, the surface presented for staking is a smooth, elliptic, single closed curve, devoid of interruptions such as lugs or projections, which feature in itself lends itself to repeatable tool making with direct respect to the all important cold-forming die. By providing the present nut blank with a crown portion presenting an elliptic curve at the top end face thereof, it will be understood that alteration of this elliptic curve as well as the cone height of the nut crown provides means for controlling the resultant degree of deformation from the staking operation to thereby determine the locking torque range as a narrow band rather than a broad spread. This deformation is achieved by an impact blow applied for example, with a confining die, vertically upon the crown to thus convert the elliptic closed curve towards a circular shape so that the metal from the elliptic nodes is contained or directed by the impact tool. Such deforming directs distortion of the initial nut shape both radially inwardly to the bore as well as laterally to the crown surface. This flow action is thereby distributed over the initial nodal elliptic area avoiding limited points of high pressure and stress which are so conducive to fracture and uncontrollable torque test values. The elimination of this high stress as a result of the present smooth uninterrupted crown curve also precludes during the heat treating operations upon the nut any excessive carbon restoration and therefore prevents localized areas of undesirable hardness.

Incipient with the design of this locking fastener is the consideration that from the bottom face, which is the intended surface of application, the majority of the internal thread offers a free-running fit with the mating male member. Because of this free engagement condition, there is no threat of cocking or deforming the threads of mating parts and defeating the purpose of the joint as a reapplicable, non-destructive, locking fastener.

Accordingly, one of the primary objects of the present invention is to provide a lock nut having a crown portion formed from a staked smooth elliptic single closed curved surface devoid of interruptions such as lugs or projections.

Another object of the present invention is to provide a lock nut having a non-deformed main body and a staked crown portion the end face of which presents a tapped bore defining an elliptic single closed curve.

A further object of the present invention is to provide a lock nut including a smooth surfaced crown portion, the upper edge of which is circular and including inwardly deformed threads within the confines of said crown portion.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing in which.

Similar reference characters designate corresponding parts throughout the several figures of the drawing.

Figure 1:
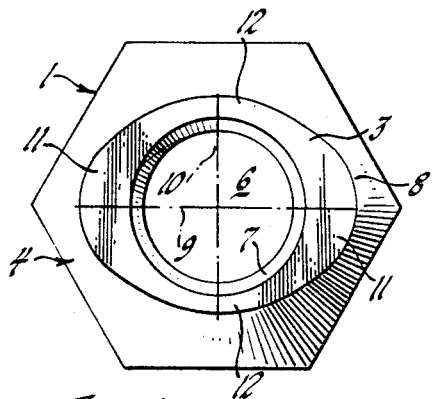
FIGURE 1 is a top plan view of a nut according to the present invention as it appears prior to the staking operation.
Figure 2:
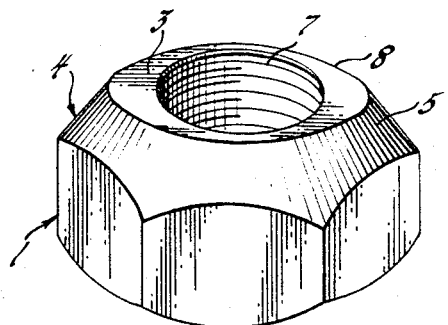
FIGURE 2 is a perspective view of the nut of FIGURE 1.

Referring now to the drawing, particularly, FIGURE 2, the present invention will be seen to comprise a lock nut including a poly-sided body generally designated 1 having a flat bottom end face 2 and a top end face 3 preferably perpendicular to the flat lateral surfaces of the body. Although the illustrated nut body is a hexagon, quite obviously any of several other shapes may be utilized whether symmetrical or not; however, for most purposes at least two oppositely disposed lateral surfaces should be parallel to facilitate application of the lock nut by conventional wrenching. The bottom end face 2 serves as the usual bearing surface upon application of the lock nut while the upper portion of the nut is provided with a crown 4 which is basically a conically tapered extension projecting upwardly from the main body portion 1. As shown in FIGURES 1–4, the inclined peripheral surface 5 of the crown 4 comprises a smooth continuous surface extending upwardly from the top edges of each of the lateral surfaces of the body 1 and terminates at the periphery of the top end face 3.

FIGURES 1 and 2 disclose the nut blank prior to the staking operation at which time the bore 6 having the threads 7 presents a circular configuration while the periphery of the top end face 3 describes a continuous smooth closed curve such as an ellipse 8, having a major axis 9 and minor axis 10. By this formation the material of the crown portion 4 of the nut blank is provided with a plurality of nodes 11 on the one hand and radially reduced areas 12 on the other. Although an ellipse has been shown as a preferred formation for the crown structure, it will be understood that any other suitable geometric shape may be utilized which is based upon a smooth continuous closed curve such that a continuous surface 5 will be provided for the periphery of the crown 4.

Figure 3:
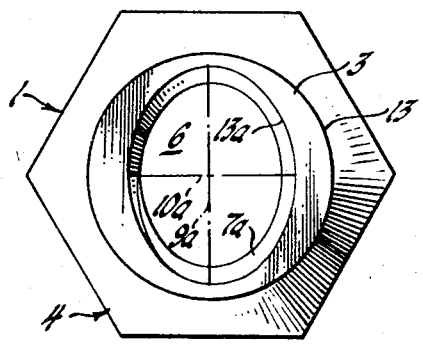
FIGURE 3 is a top plan view of the nut of the present invention as it appears after the staking operation.
Figure 4:
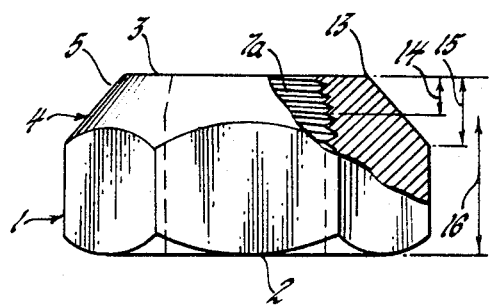
FIGURE 4 is a side elevation, partly in section, of the nut of FIGURE 3.

To provide the completed lock nut as shown in FIGURES 3 and 4, the crown peripheral surface 5 is squeezed, staked or impacted by means of a suitable tool such as a die to a degree sufficient to convert the elliptical periphery 8 to a theoretical circle 13 as shown in FIGURE 3. In the formation of the circle 13 by means of a conical die the material of the crown 4 will be substantially displaced inwardly at the points of the nodes 11 to compress the major axis 9 while at the same time the reduced areas 12 along the minor axis 10 will be slightly displaced radially outwardly of the bore 6 such that the internal thread 7 will be distorted accordingly. By this manner of displacement or deformation there is provided increased torque characteristics to the lock nut while there will also be achieved a minimum of galling or binding of the nut with its threaded male member due to the resultant elasticity of the contact area therebetween. This inward deformation of the threads along the major axis 9 occurs in the manner of a hinge action within the area defined by the line 14 in FIGURE 4 and is confined entirely within the area of the crown height as designated by the line 15. The pivot point of this hinge action is shown as approximately midway of the crown height 15 but will vary as to location depending upon the inclination of the conical die and degree of pressure applied thereby, which factors will determine the amount of thread deformation.

As a result of the deforming operation, it will be understood that a definite relationship will exist between the outer circular edge 13 of the crown top end face 3 and the elliptic inner edge 13a thereof. The resultant radial dimension of the end face between these two edges varies about the circumference of the crown with the dimensions adjacent the staked portions in alignment with the minor axis 10a being substantially greater than the dimensions adjacent the major axis 9a.

Figure 5:
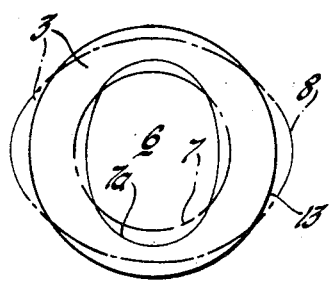
FIGURE 5 is a schematic view showing in full and broken lines a comparison of the top end face of a conical portion as it appears both before and after the staking operation.

After deformation it will be seen that the tapped round bore 6 is converted to achieve the elliptic threaded arrangement 7a adjacent the top end face 4. The alteration of the crown during the metal displacement operation will be most clearly understood when considering FIGURE 5 which illustrates, in superposed relationship, the shape of the top end face 3 of the crown 4 both before and after deformation, with full lines representing the peripheral edge 13 and interior threads 7a of the completed lock nut. This deformation provides the desired locking shape thus creating an elastic vise-like grip upon the mating member during application of the unt. It is this gripping action which is responsible for a more uniform locking torque and the absence of thread seizure or galling. Thus, ability of this prevailing torque lock nut to be reapplied after disassembly is ensured as well as restraint from damage to its mating thread form. The free-running nature of application of the lock nut to its mating member will be apparent from FIGURE 4 wherein it will be seen that the threads indicated by the line 16 extending up into the crown area of the nut body have not been altered in any manner.

What is claimed is:
1. A prevailing torque lock nut comprising, a nut body having a plurality of substantially vertical lateral surfaces and provided with a tapped axial bore,
the threads in said bore of substantially constant radial depth both peripherally and throughout the axial extent of said bore,
a conically tapered crown at one end of said body having a flat top end face, said end face including an outer edge adjacent said crown defining a true circle comprising a smooth uninterrupted curve, the inner edge of said end face adjacent said threads comprising a continuous smooth irregular curve having a major axis and a minor axis,
the peripheral surface of said crown comprising a smooth continuous surface of revolution extending the axial height of said crown from said circular outer edge to the top of said lateral surface, the crown portion of said body including a plurality of oppositely disposed radially and inwardly displaced areas forming inwardly hinged thread portions in said axial bore defining said irregularly curved inner edge, said inwardly displaced areas juxtaposed the minor axis of said bore adjacent said top end face,
said top end face adjacent said inwardly displaced areas of substantially greater radial thickness than said top end face intermediate said displaced areas,
and said threads are of free-running nature to a point within said crown and said inwardly hinged thread portions extend axially from the end of said free-running threads within said crown to said top end face, whereby the transition of said threads from the free-running form to said inwardly hinged portions is gradual both in plan and vertical section.

2. A prevailing torque lock nut according to claim 1, wherein, said inner edge of said top end face substantially defines an ellipse.

3. A method of making a prevailing torque lock nut from a nut blank including a central bore and a plurality of substantially vertical lateral surfaces, a top end face having an outer edge defining an irregular curve presenting a major and minor axis, a tapered crown having a peripheral surface extending from the top of said lateral surfaces to said top end face outer edge whereby enlarged nodes are provided in said top end face along said major axis, said method comprising, tapping said circular bore to provide a thread having a substantially constant radial depth both peripherally and throughout the axial extent of said bore, placing a die having a continuous circular conical cavity over said top end face, lowering said circular die onto said blank whereby said die cavity initially engages said nodes and displaces said nodes radially inwardly, continuing to lower said die to further displace said nodes radially inwardly as the material of said top end face along said blank minor axis is radically displaced outwardly to form said top end face outer edge into a perfect circle as said threads adjacent said nodes and within the axial height of said crown are displaced inwardly, to provide an inner edge on said top end face comprising a continuous smooth irregular curve whereby the radial thickness of said top end face is greatest at points juxtaposed said inwardly displaced threads.

References Cited
UNITED STATES PATENTS

| | | | |
|---|---|---|---|
| 3,208,494 | 9/1965 | Skidmore | 151—21 |
| 3,340,920 | 9/1967 | Johnson | 151—21 |
| 2,370,352 | 2/1945 | Hosking | 151—22 |
| 3,198,230 | 8/1965 | Stover | 151—21 |

CARL W. TOMLIN, *Primary Examiner.*

EDWARD C. ALLEN, *Examiner.*